(12) United States Patent
Larson et al.

(10) Patent No.: US 7,574,413 B2
(45) Date of Patent: Aug. 11, 2009

(54) SYSTEM AND METHOD OF DISCOVERING INFORMATION

(75) Inventors: Jeffrey S. Larson, Austin, TX (US); Gary Cole, Driftwood, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 1638 days.

(21) Appl. No.: 10/006,763

(22) Filed: Dec. 6, 2001

(65) Prior Publication Data

US 2002/0095395 A1 Jul. 18, 2002

Related U.S. Application Data

(60) Provisional application No. 60/251,952, filed on Dec. 7, 2000, provisional application No. 60/251,627, filed on Dec. 6, 2000.

(51) Int. Cl.
*G06N 5/02* (2006.01)
(52) U.S. Cl. .............................. 706/47; 707/1; 707/10; 707/203
(58) Field of Classification Search .................. 706/47; 709/224, 226; 707/1
See application file for complete search history.

(56) References Cited

U.S. PATENT DOCUMENTS

| | | | |
|---|---|---|---|
| 5,724,575 A | 3/1998 | Hoover et al. | |
| 5,835,765 A | 11/1998 | Matsumoto | ................. 718/102 |
| 6,016,478 A | 1/2000 | Zhang et al. | .................... 705/9 |
| 6,189,000 B1 | 2/2001 | Gwertzman et al. | ............ 707/1 |
| 6,269,405 B1 | 7/2001 | Dutcher et al. | |
| 6,321,264 B1 * | 11/2001 | Fletcher et al. | ............. 709/224 |
| 6,377,950 B1 | 4/2002 | Peters et al. | .................. 707/10 |
| 6,578,069 B1 | 6/2003 | Hopmann et al. | ........... 709/203 |
| 6,766,368 B1 * | 7/2004 | Jakobson et al. | ............ 709/224 |
| 6,799,208 B1 | 9/2004 | Sankaranarayan et al. | .. 709/223 |
| 7,051,071 B2 | 5/2006 | Stewart et al. | |

OTHER PUBLICATIONS

LsMeyer et al, "On Designing a Database for Integrated User Management: Pitfall and Possibilities", http://www.usenix.org/events/lisa-nt2000/lameyer/lameyer.pdf, Published Year 2000.*

La Meyer, et al., "On Designing a Database for Integrated User Management: Pitfalls and Possibilities" Boston University 'Online!', retrieved from www.usenix.org/events/lisa-nt2/000/lameyer/lameyer.pdf, 4 sheets, Aug. 2000.

(Continued)

*Primary Examiner*—David R Vincent
*Assistant Examiner*—Mai T Tran
(74) *Attorney, Agent, or Firm*—Robert C Kowert; Meyertons, Hood, Kivlin, Kowert & Goetzel, P.C.

(57) ABSTRACT

Embodiments of the present invention include the steps of (i) defining a first resource containing information objects defining a set of users; (ii) discovering said information objects based on said first resource definition; (iii) associating each of said information objects with a user from said set of users and said first resource. Embodiments of the present invention can include delegation of discovery tasks to allow additional resources to be defined.

59 Claims, 5 Drawing Sheets

OTHER PUBLICATIONS

Arbee, et al., "Schema Integration and Query Processing for Multiple Object Databases", National Tsing Hua University, 'Online!', pp. 1-27, retrieved from www.citseer.nj.nec.com/chen95schema/html, on Jun. 24, 2003.

Parent, et al., "Issues and Approaches of Database Integration" Communications of the Association for Computing Machinery, Association for Computing Machinery, New York, vol. 41, No. 5, pp. 166-178, 1998.

Gamal-Eldin, et al., "Integrating Relational Databases with Support for Updates", CH2665-8/88/0000/0202$01, pp. 202-209, Dec. 5, 1998.

International Search Report for PCT/US01/46978 mailed Jul. 31, 2003.

Fink, J., "Institute white pages as a system administration problem", Proceedings of the Tenth Systems Administration Conference (LISA '96) Proceedings of 10th UNSENIX Systems Administration Conference (LISA '96), Chicago, IL, USA, Sep. 29, 1996.

Remote Procedure Call http://en.wikipedia.org/wiki/remote_procedure_call (1 page) Dec. 6, 2004.

* cited by examiner

SYSTEM AND METHOD OF DISCOVERING INFORMATION

RELATED INFORMATION

This application claims priority under 35 U.S.C. §119(e) to U.S. Provisional Patent Application Ser. No. 60/251,627 entitled "System and Method for Automatically Discovering Information," filed on Dec. 6, 2000, which is hereby fully incorporated by reference. This application also claims priority under 35 U.S.C. §119(e) to U.S. Provisional Patent Application Ser. No. 60/251,952 entitled "System and Method for Tracking Information in a Pointer-Driven Repository," filed on Dec. 7, 2000, which is hereby fully incorporated by reference.

TECHNICAL FIELD OF THE INVENTION

The present invention relates generally to systems and methods of systems management. More particularly, the present invention relates to a system and method for the discorery for data. Even more particularly, the present invention relates to a system and method for the discovery of user accounts and other information objects on a network.

BACKGROUND OF THE INVENTION

Processing and storage of electronic data is now essential to the daily operation of most organizations. With the advent of networking technology, organizations that utilize electronic data processing are becoming increasingly reliant upon "enterprise" computer networks in which processing and storage are distributed over a number of heterogeneous interconnected computers. In many enterprise systems, a member of the organization will have access to multiple resources across the system. For example, an employee of a corporation may use an email account, a Windows NT account, and a Unix account to access and process data stored on the enterprise system. Additionally, organizations will often wish to provide external users, such as distributors, business partners and suppliers, with accounts granting limited access to the data stored on the enterprise system. The administrative overhead required to manage the internal and external accounts often becomes more difficult to manage than the data that is actually of interest to the organization. This can lead to decreases in system efficiency and to high support costs.

Consequently, organizations are becoming increasingly interested in efficient systems management as it can provide, among other benefits, reduced information technology ("IT") costs and increased efficiency in setting up and managing enterprise data. Currently, however, providing efficient systems management for enterprise computer networks, particularly those that contain legacy data, is a quixotic task. This is partly because many organizations, over time, have developed networks including a variety of heterogeneous computer systems storing myriad different data types. Further adding to the complexity of managing enterprise networks, organizations often store inconsistent data across the network. As just one example of data inconsistencies, a company may store one home phone number for an employee at a corporate human resources ("HR") mainframe while storing a different home phone number at a departmental mainframe. Because the two mainframes may be heterogeneous (e.g., employ different hardware, operating systems, protocols, tools and/or applications), synchronizing between the two resources to eliminate inconsistencies can prove difficult.

Most prior art systems management techniques address these difficulties by centralizing data. Profile-based management systems, directory-based management systems, and meta-directories offer various approaches to centralizing data storage. FIG. 1 illustrates the limitations of prior art systems that rely on centralization of data. FIG. 1 is a diagrammatic representation of computer system 100 comprising an administrative system 110, including a centralized database 112, and resources including an email server 120 (such as a Microsoft Exchange server), a Unix system 125, a Windows NT system 130 and a mainframe 135. The resources are interconnected to each other and are connected to administrative system 110 via a network 145. Each resource can contain a collection of data items that represent entities or individuals. For example, e-mail server 120 can contain a collection of email accounts 150, Unix system 125 can contain a collection of Unix accounts 155, Widows NT system 130 can contain a collection of Windows NT accounts 160 and mainframe 135 can contain a collection of data records 165.

These collections of data represent each resource's "view" of an individual or entity. In the case of an employee Jane Doe, for example, email server 120 may refer to her as janed (i.e., her e-mail user name), Unix system 125 may refer to her as JaneD (i.e., her Unix account user name) or by her Unix identification ("UID"), and Windows NT system 130 may refer to Jane Doe as JANED (i.e., her windows NT account user name). In addition to account information allowing Jane Doe to access data on computer system 100, information such as Jane Doe's department code, time keeper number, salary rate, and employee identification can be stored at mainframe 135. This may be information that is not personally used by Jane Doe, but it is used, instead, by her managers or other personnel. Thus, mainframe 135 would also maintain an identity for Jane Doe, based on her employee record, which could, for example, be stored under JANE_D.

To illustrate the shortcomings of prior art systems that rely on centralization of data, assume that employee Jane Doe marries and changes her last name to Smith. One method of updating Jane Doe's name on system 100 would be to separately enter the updated information at each system. For an organization having a large number of users and/or a highly distributed computer system 100, this can be impractical. To ameliorate the inefficiencies of separately entering information at each resource, one prior art system replicates all the information identifying individuals or entities in a centralized database 112 (represented by replicated data 175). Thus the collection of email accounts 150, the collection of Unix accounts 155, the collection of Windows NT accounts 160 and the collection of data records 165 are typically replicated at centralized database 112. When a change is made to the data, the change can be entered to replicated data 175 and can then be pushed out to each of the resources. In the case of Jane Doe, then, replicated data 175 is modified to account for her name change, and the replicated data can then be pushed out to one or more resources. In the case of an individual such as Jane Doe, the replicated data, thus, contains a "master copy" of her data.

While a system having a centralized database helps ensure data consistency for data entered through administrative system 110 and pushed out to each resource, it has several shortcomings. One such limitation involves the resolution of inconsistencies between data changed at the individual resources. Continuing with the example of newlywed Jane Doe; if Jane Doe changes her last name to Smith, her name may be inadvertently changed to Smyth at mainframe 135, while her name is changed to Smith at email server 120. When data from the resources is copied to centralized database 112, there will be three names for the same employee on computer system 100: Jane Doe, Jane Smyth and Jane Smith. Administrative system 110 must determine if a name change is actually appropriate and which of the changes is appropriate. Once the specific change is selected, the change is distributed to the resources, overwriting local changes (or lack of changes) made at each resource. Thus, for example, if Jane Smyth was arbitrarily selected as the correct change, Jane Smyth would be distributed to each of the resources, overwriting the correct name, Jane Smith.

Furthermore, if different resources are controlled by different groups within the organization, the decision to favor one resource over another can lead to political tension within the organization. As an additional limitation of this prior art system, in a large enough computer system 100, some subset of the resources will be unavailable at any given time due to connectivity issues or other technical problems. Therefore, only some of the resources will be updated, causing additional inconsistencies in Jane Doe's data.

In order to implement a centralized database approach, prior art systems typically rely on an overall systems administrator or manager to identify resources used by members of the organization. This administrator's view of which resources members of the organization require, however, is typically limited and the administrator generally has little idea of which resources are used on a department-by-department basis or of the resources used on an individual level. Furthermore, prior art systems typically do not automate the process of retrieving, mapping, correlating and merging information from multiple heterogeneous sources. Because of this, administrators must typically write ad hoc queries and scripts to extract, map, correlate, merge and upload information into the centralized database 112, making implementation of the centralized database tedious.

Centralization of data typically requires replicating at least some subset of the data being managed. This type of system scales poorly because of the large amount of data that must be stored at the centralized database 112 and it further introduces problems with synchronizing the centralized database 112 with the resources. Furthermore, because these systems require data to be copied repeatedly back and forth from the resources to the centralized database 112, significant bandwidth demands are inflicted upon the network. As yet another shortcoming, manually locating and organization data from a number of resources typically requires significant investments of time and money. Thus, prior art systems are generally expensive and inefficient.

SUMMARY OF THE INVENTION

Embodiments of the present invention comprise a system and method for discovering data on a network that substantially reduces or eliminates problems associated with previous data discovery systems and methods. More particularly, embodiments of the present invention provide a system and method for automatically discovering information on a network.

Embodiments of the present invention can comprise the steps of (i) defining at least one source resource, such as an email server, containing a set of information objects (e.g., accounts), wherein the set of information objects defines a set of users; (ii) extracting said set of users from said source resource; (iii) defining an additional resource containing a second set of information objects, wherein each information object from said second set of information objects corresponds to a user from said set of users; (iv) automatically discovering said second set of information objects from said additional resource; and (v) associating each information object from said second set of information objects with the corresponding user from said set of users.

Another embodiment of the present invention comprises (i) defining a first resource containing information objects defining a set of users; (ii) discovering said information objects based on said first resource definition; (iii) associating each of said information objects with a user from said set of users and with said first resource.

Yet another embodiment of the method of the present invention includes a method comprises the steps of (i) receiving a first resource definition from a first administrator, wherein said first resource contains a first set of information objects defining at least one user from a set of users; (ii) receiving a second resource definition from a second administrator, wherein said second resource contains a second set of information objects defining at least one user from said set of users; (iii) discovering said first set of information objects from said first resource; (iv) associating each information object from said first set of information objects with at least one user from said set of users and with said first resource; (v) discovering said second set of information objects from said second resource; and (vi) associating each information object from said second set of information objects with at least one user from said set of users and with said second resource.

Yet another embodiment of the present invention comprises the steps of (i) defining a plurality of resources, wherein each of the plurality of resources contains a set of information objects defining at least one user from a set of users; (ii) discovering said set of information objects from each of the plurality of resources; and (iii) associating each information object from said set of information objects with a user from said set of users and with the resource from which the corresponding information object was discovered.

Embodiments of the present invention provide an advantage over prior art systems and methods of data management by locating data on a computer network in an automated manner, thereby being more efficient and cost effective.

Additionally, embodiments of the present invention provide an advantage over prior art systems and methods of data management by utilizing a phased approach to data discovery. A phased approach to data discovery allows for more accurate and economical discovery of data than prior art systems.

Additionally, embodiments of the present invention provide an advantage over prior art systems and methods of data management by supporting delegation of discovery. Delegating data discovery allows for more accurate and economical discovery of data than prior art systems.

As an additional advantage provided by embodiments of the present invention, the present invention can reduce bandwidth requirements for managing user accounts.

Additionally, embodiments of the present invention provide a significant advantage over the prior art by being highly scalable.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts.

Embodiments of the present invention comprise a system and method for the automated discovery of data items on a network. Embodiments of the present invention can comprise delegated discovery, wherein the steps of defining resources for the discovery process are delegated among a plurality of administrators and end users. Delegation of discovery allows the discovery process to be configured by those most knowledgeable about resource usage and thereby increases the accuracy of discovery. Furthermore, embodiments of the present invention automate the discovery process, thereby decreasing implementation time and complexity.

For the purposes of this application, the term "resource" can mean a system or application accessible by a network that defines information objects related to its management or operation. For example a Unix system can be a resource that defines user accounts (i.e., information objects), typically in its/etc/passwd file, a Windows system can be a resource that defines user accounts in its User Manager application and a DBMS system can be a resource that defines user accounts in special table or tables. It should be noted that a resource can comprise a particular computer system (distributed or undistributed), an application on a computer system, or an application distributed across several computer systems. A "user" can be a human, a programmatic or a computer system that uses the resources. An "information object" can be a collection of one or more pieces of data that can represent a single entity or identity. In other words, an information object (such as an account) can represent a resource's "view" of an entity (such as a user). An attribute can be a single piece of information (e.g., a data structure with a name, a data type and zero, one or more values) that constitutes at least part of an information object. A "resource attribute" can be an attribute residing on a resource. A "schema" can be the structure of and relationships between classes of information objects on a resource. The schema can include the set of attribute definitions the resource uses to describe each information object. A "virtual identity" can be a composite identity of a user based on one or more information objects discovered from one or more resources. A "virtual information object" can be a collection of attributes constructed based on the information objects associated with a specific virtual identity.

Figure 1:
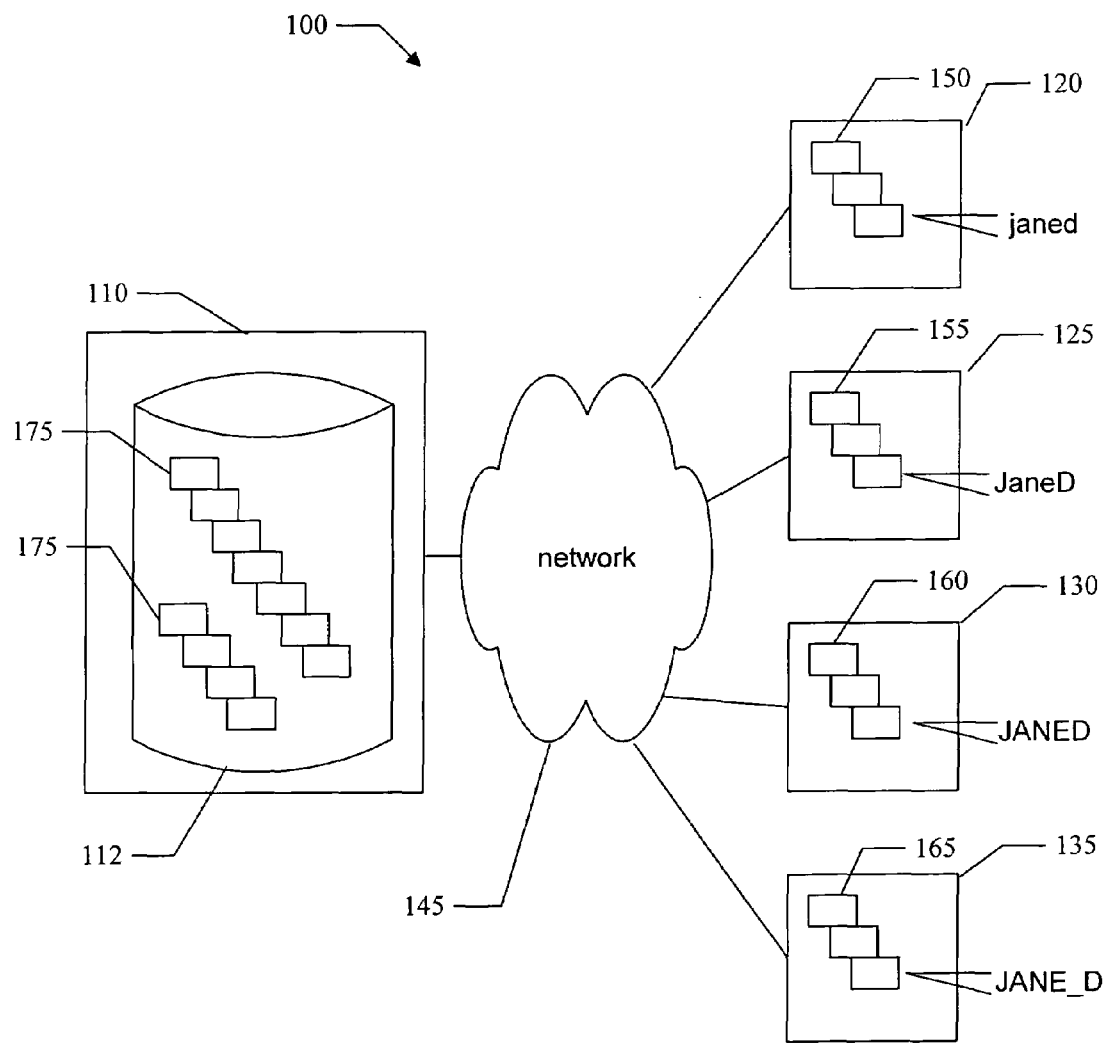
FIG. 1 illustrates a prior art system for systems management in which data is replicated at a centralized database.
Figure 2:
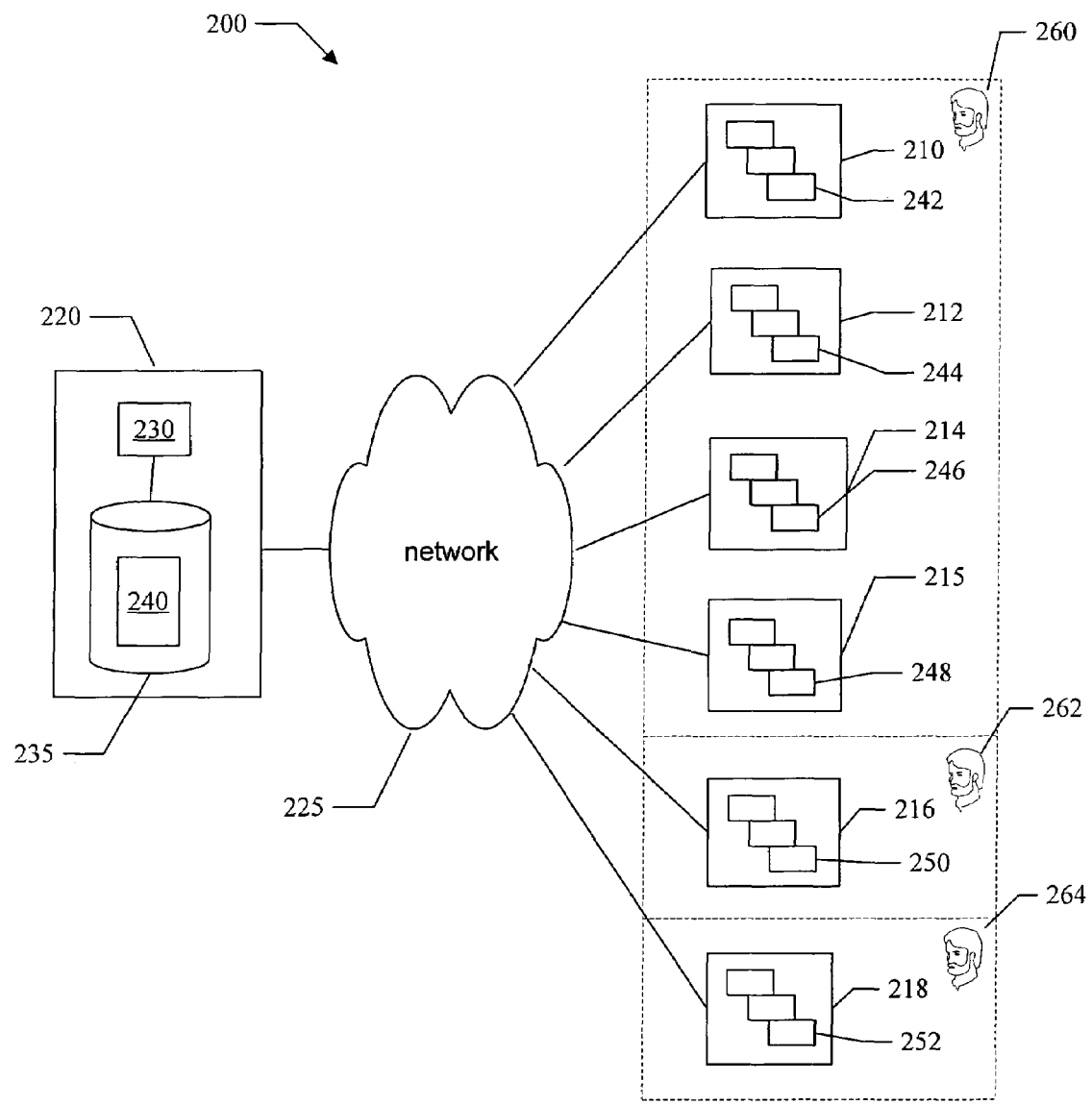
FIG. 2 illustrates one embodiment of a computer system in which the teachings of the present invention can be implemented.

FIG. 2 illustrates a system 200 in which one embodiment of the present invention can be implemented. System 200 can comprise a plurality of resources (here, indicated as resource 210, resource 212, resource 214, resource 215, resource 216 and resource 218). Each resource can include a computer system (either discrete or distributed) and/or an application on a computer system. While system 200 includes multiple resources, it should be understood that the present invention can be implemented in a system having only one resource. System 200 can also include an administrative system 220 operable to access the resources via network 225, which can be a LAN, WAN, global area network (e.g., the internet, wireless network) or any other electronic communications network known in the art. Administrative system 220 can comprise a computer processor 230, a computer readable memory 235 (e.g., RAM, ROM, computer readable magnetic storage device and/or other computer readable memories known in the art) and a software program 240 executable by computer processor 230 to implement automated discovery of information objects and users from the resources. While administrative system 220 is shown as a discrete system, it should be understood that administrative system 220 can be distributed and/or implemented in the same physical unit(s) as one or more of the resources.

Each resource can define information objects related to its management or operation. By way of example, resource 210 can comprise an Oracle database system including employee records 242 as information objects; resource 212 can comprise first Unix system containing a first set of Unix user accounts 244; resource 214 can comprise a Windows NT system containing a set of NT user accounts 246; resource 215 can comprise an email server (e.g., Microsoft Exchange Server) containing email accounts 248; resource 216 can comprise a second Unix system containing a second set of Unix user accounts 250; and resource 218 can comprise a third Unix system containing a third set of Unix user accounts 252. The resource accounts (i.e. information objects) represent each resource's "view" of a particular user. In other words, each resource account (and the attributes that make up that account) represent a user within the scope of the resource. Thus, for example, to email server 215, user Jane Doe is:

User name: Jane Doe
account name: jdoe
password: *********
employee id: 12345

It should be noted that not all users will have access to all the resources of system 200. Further, different administrators in an organization can have different levels of knowledge about whether particular users or types of users, as will be discussed in greater detail below, utilize a particular resource. For example, administrator 260 may know that all members of the organization have records on Oracle database 210, Unix accounts on first Unix system 212, user accounts on Windows NT system 214 and email accounts on email server 215. In addition, first departmental administrator 262 may have knowledge about which users have accounts on second Unix system 216 and second departmental administrator 264 may have knowledge about which users have accounts on third Unix system 218.

As will be discussed in greater detail below, based on information provided by one or more of the administrators and/or by the end-user, program 240 can discover and correlate accounts on system 200 and create an identity index associating these accounts with users. Thus, embodiments of the present invention can "collect" resource-specific identities (e.g., accounts) to construct a virtual information object.

Thus, with varying degrees of input from the administrators (e.g., administrator 260, first departmental administrator 262 and second departmental administrator 264), software program 240 can locate information objects and data items on the resources, correlate the information objects to users and create an index associating each user with information objects and resources. Furthermore, software program 240 can retrieve attributes from each resource and present the data items in a canonical format without replicating the attributes at a centralized database (i.e., without storing the values for the attributes in nonvolatile memory). While the present invention will be described primarily in terms of managing computer accounts of various formats accessed by human users, the teachings of the present invention are equally applicable to discovering any information objects and users. Thus, for example, embodiments of the present invention are configurable to discover routing tables that reference a particular network element and so on.

Figure 3:
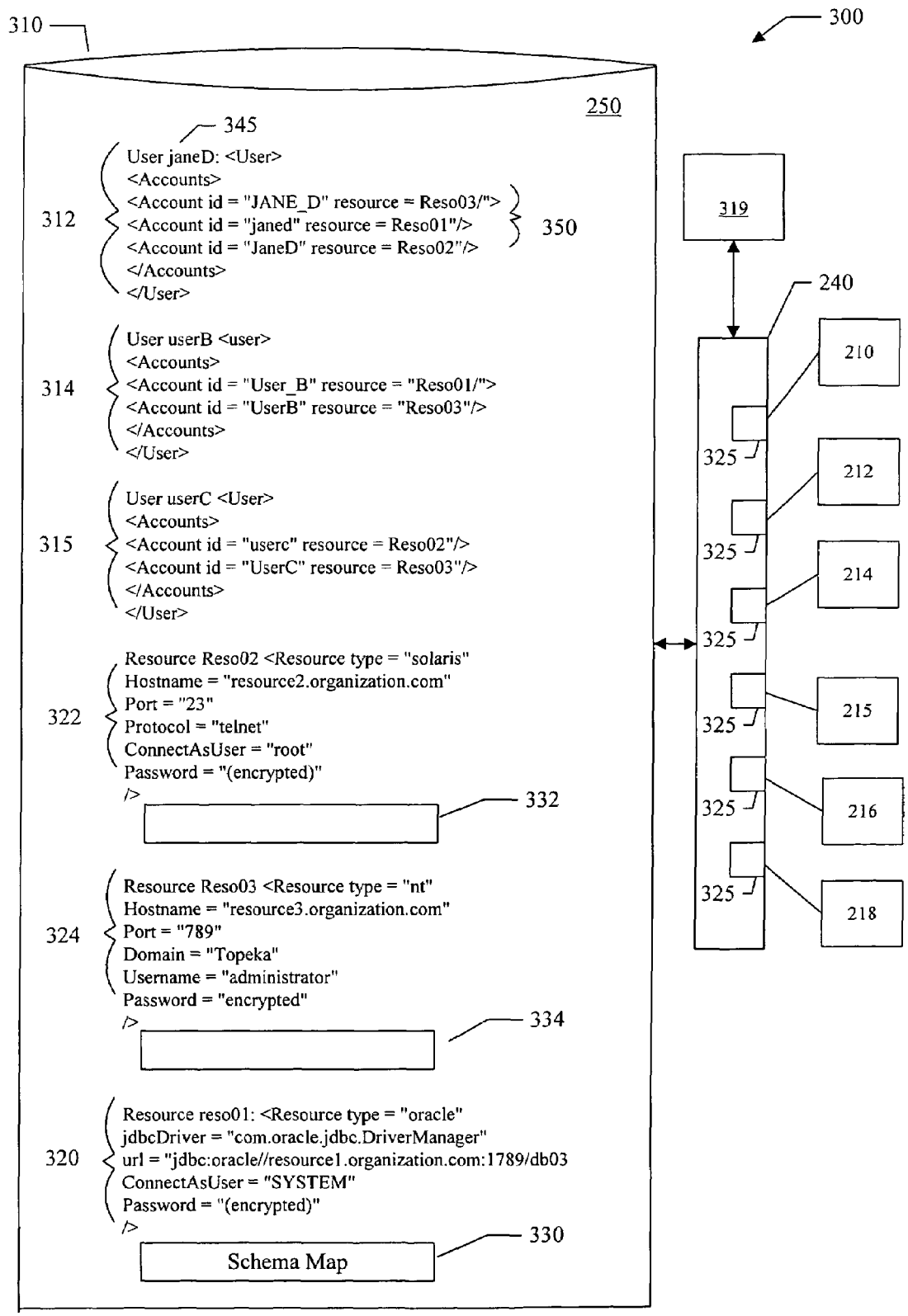
FIG. 3 illustrates a system of account management according to one embodiment of the present invention.

FIG. 3 is a diagrammatic representation of a management system 300 for managing user accounts according to one embodiment of the present invention. Management system 300 can comprise software program 240 for discovering users and resource accounts from resources, an identity index 310 to associate users with resource accounts, schema maps (e.g., schema map 330, schema map 332 and schema map 334, discussed below) to associate resource attributes with virtual attributes, and a composite view 319 to present a "view" of a user according to one or more resources. Software program 240, as noted earlier, identity index 310 and the schema maps can be stored in a memory 235 of administrative system 220 (see, FIG. 2).

Software program 240 can invoke resource adapter modules 325 to communicate with Oracle database system 210, first Unix system 212, NT system 214, email server 215, second Unix system 216 and third Unix system 218. One resource adapter module 325 is typically operable to communicate with a particular resource type (e.g., one resource adapter 325 can be invoked to communicate with all the Unix systems), however separate resource adapter modules 325 could also be used for each resource, as illustrated in FIG. 3. As would be understood by one of ordinary skill in the art, resource adapter modules can also be configured to communicate with any resource type. From the resources, software program 240, as will be discussed in conjunction with FIG. 5, can extract a list of resource users from one or more of the resources, create virtual identities for the users and associate resource accounts with users in identity index 310.

In the embodiment illustrated in FIG. 3, identity index 310 can contain a number of virtual identities (e.g., virtual identities 312, 314 and 315). The virtual identities 312, 314 and 315 can be created by software program 240 based on users discovered on the resources by software program 240, or they can be independently created (e.g., by an administrator). Each virtual identity 312, 314 and 315 can contain a virtual identity name 345 and a list of resource accounts 350 associated with the user corresponding to the virtual identity. For example, if employee Jane Doe has an account on Oracle database system 210, first Unix system 212 and NT system 214, the native key for those accounts (e.g., the account ID) and the resource on which those accounts are located can be stored in Jane Doe's virtual identity. Additional resource attributes can be stored in a virtual identity depending on the configuration of system 300 (e.g., if the organization wishes the capability to search identity index 310 by user name, they may want to store attributes such as "firstname," "lastname," or "fullname").

Additionally, identity index 310 can include a set of resource definitions, such as resource definitions 320, 322, and 324. In FIG. 3, resource definition 320 corresponds to Oracle database system 210, resource definition 322 corresponds to first Unix system 212 and resource definition 324 corresponds to NT system 214. Each resource definition can contain the information needed by software program 240 to connect to the corresponding resource. One embodiment of an identity index 310 of the system and methods of the present invention is described in greater detail in U.S. patent application Ser. No. 10/006,089, entitled "System and Method for Managing Information Objects" filed Dec. 6, 2001, which is hereby fully incorporated by reference.

Additionally, each resource definition can include a schema map. Thus resource definition 320 can include schema map 330, resource definition 322 can include schema map 332, and resource definition 324 can include schema map 334. A schema map associates resource-specific information object (e.g., account) attributes to a virtual attribute defined in the schema map. In this manner, the schema map allows software program 240 to display attributes values (i.e. data items) from different resources in a common format. For example, attributes from different resources can be mapped to the same virtual attribute. Thus for example, if Oracle database system 210 contained an attribute named "phone" and first Unix system 212 contained an attribute name "ph_num," schema maps 330 and 332 could, respectively, map the attributes to a virtual attribute named "Phone Number."

Figure 4:
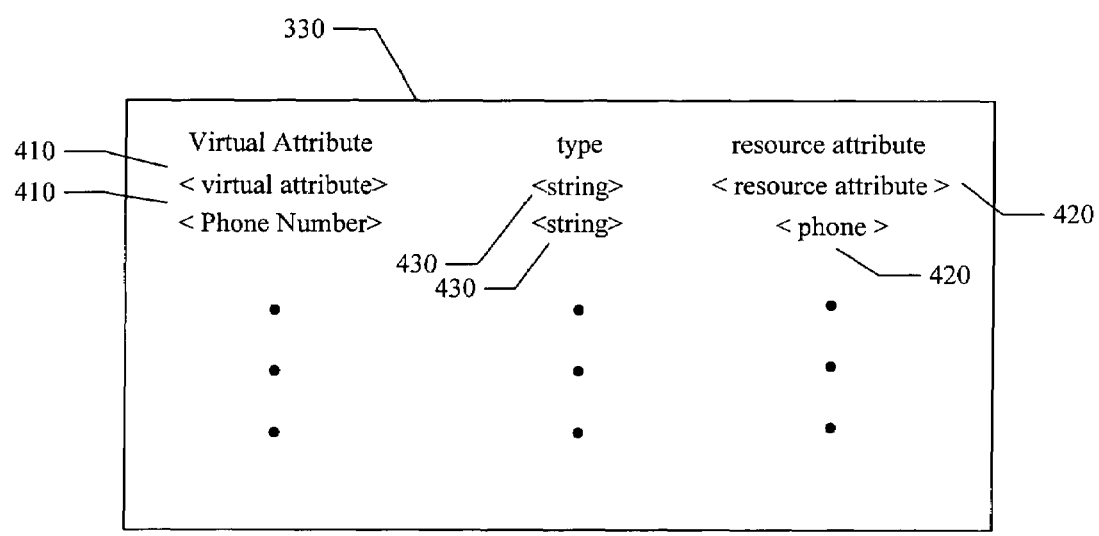
FIG. 4 illustrates a schema map according to one embodiment of the present invention.

In one embodiment of the present invention, the values for the virtual attribute "Phone Number" are not be stored in identity index 310. Instead, when a user or administrator accesses the user's virtual identity, software program 240 can access the attributes "ph_num" and "phone" (from resources 212 and 210, respectively), store the values in RAM (e.g., construct a virtual information object) and display the values under "Phone Number" in composite view 319. If the values match, composite view 319 can display only one value (in a graphical user interface, for example), or if the values do not match, the user or administrator can be given the option to select the correct value. Furthermore, if the administrator or user makes a change to a virtual attribute associated with a user, the change can be pushed out to the appropriate resource-specific attributes based on the schema maps. The schema maps, thus, provide a way to represent resource-specific attributes in a standard or canonical format (i.e. to construct a virtual information object) and to map changes back to resource specifications. FIG. 4 illustrates one embodiment of a schema map.

Composite view 319 can comprise a view of a user's accounts as defined by a schema map. Based on the schema map(s), composite view 319 can contain virtual attribute values derived from the resource-specific attributes for a user and can be presented to administrators and users through a graphical user interface. The organization implementing system 300 can determine various levels of authority for administrators and users to view and or modify certain virtual attributes. Thus, the graphical user interface may display different information to a user or administrator depending on his or her status. When a user or administrator modifies the value for a virtual attribute, software program 240 can push the change to the virtual attribute to the resource-specific attributes associated with the modified attribute in the schema map. Thus, data across resources can be synchronized without replicating the attributes at a central database.

FIG. 4, illustrates one embodiment of a schema map (e.g., schema map 330 of FIG. 3). A schema map for a particular resource, such as schema map 330, can contain a virtual attribute 410, resource attribute 420 and an attribute type 430. In the example of FIG. 4, one virtual attribute 410 is "Phone Number," whereas the corresponding resource attribute 420 is "phone." When software program 240 reads the resource specific attribute "phone" associated with a user's resource account, software program 240 can map the value for "phone" to the virtual attribute "Phone Number" for the user's virtual identity. It should be noted that the value for "Phone Number" might not be saved in nonvolatile memory (e.g., with identity index 310), but may instead only be saved in RAM while the virtual identity is being manipulated or created.

In schema map 330, attribute type 430 can comprise "string" and "Boolean" or other possible attribute types as would be understood by those of ordinary skill in the art. The attribute type 430 field can be used to map different types of attributes together. It should be noted that in some embodiments of the present invention, not every resource attribute will be mapped to a virtual attribute. These unmapped attributes will typically not appear in composite view 319, identity index 310 or schema map 330. This might occur, for example, if an organization implementing an embodiment of this invention does not want particular attributes to be discoverable, such as employees' social security numbers.

It should be further noted that if all instances of a resource type are the same, a schema map can be defined for a resource type rather than on a resource by resource basis. As such, for example, there would be one schema map for NT systems, one schema map for Unix, one schema map for LDAP and so on. However, in many cases an organization may configure the same resource in several ways. For example, an organization may store different types of data in an NT system "description" field on different systems. Thus, each resource will typically require a unique schema map.

Figure 5:
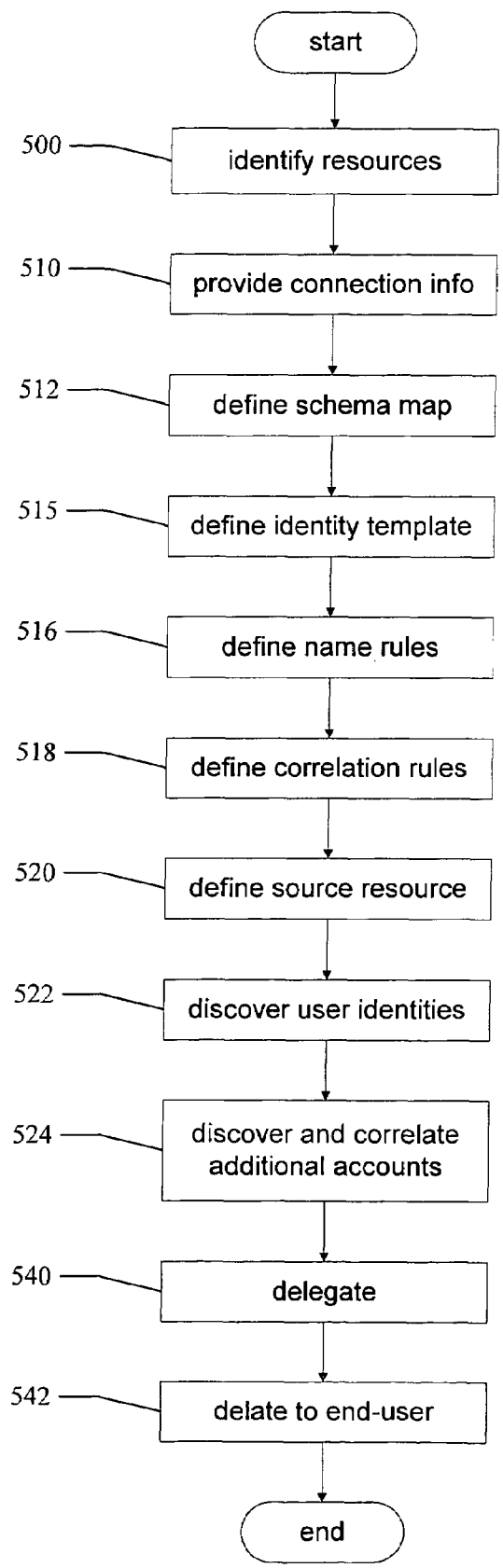
FIG. 5 is a flow chart illustrating one embodiment of a method for discovering users and information objects according to the present invention.

FIG. 5 is a flow chart illustrating one embodiment of the method of this invention for discovering information objects (e.g., accounts) and users on system 200. The process of discovery can occur in phases, beginning with "central" definition and discovery, followed by delegated definition and discovery. While these phases will be discussed separately, they can, in practice, overlap. Furthermore, the reader should understand that the phases, while presented as a sequence of tasks, are flexible and each phase and/or step can be practiced to a greater or lesser extent depending on the implementation of embodiments of the present invention. It should be further understood that the steps of FIG. 5 can involve both human action by an administrator and automated software processing performed by software program 240.

In steps 500-515 an administrator can identify and define resources. During the first phase, this will typically be done by the administrator or by a set of administrators who have the most knowledge of resource usage on system 200 (e.g., a central administrator such as administrator 260). Thus, for example, as administrator 260 has knowledge of the resources most commonly used, administrator 260 can identify those resources (e.g., he can identify Oracle database system 210, first Unix system 212, NT system 214 and email server 215 as resources). Additionally, to "define" a resource, administrator 260, at step 510, can provide a set of identifying information, such as a name for each resource, the resource type, hostname, port number, a resource username, resource password and other such information to software program 240 through, for example, a graphical user interface. To illustrate, for Unix system 212 administrator 260 might provide the following information:
  Resource name="reso01"
  Resource type="solaris"
  Hostname="resource1.organization.com"
  Port="23"
  Protocol="telnet"
  Username="root"
  Password="********"
As a further example, administrator 260 could provide the following information for Windows NT system 214:
  Resource name="reso02"
  Resource type="nt"
  Hostname=resource2.organization.com
  Port="789"
  Domain="Topeka"
  Username="administrator"
  Password="********"

As a final example, for Oracle database system 210, administrator 260 could provide the following:
  Resource name="reso03"
  Resource type="Oracle"
  jdbcDriver="com.Oracle.jdbc.DriverManager"
  url ="jdbc:Oracle//resource3.organization.com: 1789/db03"
  Username="System"
  Password="********"

As would be understood by one of ordinary skill in the art, administrator 260 can provide information sufficient for software program 240 to connect to and communicate with a resource. As would be further understood, depending on the type of resource employed, different types of information may be required to define a particular resource. In one embodiment of the present invention, the resource definitions provided in step 510 can be stored in identity index 310.

At step 512 administrator 260 can define a "schema map" which associates different resource-specific information objects (e.g., accounts) to a virtual attribute defined in the schema map. The schema map allows software program 240 to display and manipulate attribute values from different resources in a common format. It should be noted that administrator 260 generally knows the schema of each resource (e.g., the structures of information objects on the database) or knows how to derive the schema for each resource. Based on the schema for each resource, the administrator can map attributes from different resources to the same virtual attribute at administrative system 220 (e.g. can define schema maps). In one embodiment of the present invention, not every attribute of an account is mapped to a virtual attribute in the schema map. Instead, only those attributes that the organization wishes to centrally manage are so mapped. As one example of the functionality of a schema map, administrator 260 can map an attribute in Oracle system 210 named "phone"and an attribute on first Unix system 214 named "ph_num" to a virtual attribute on administrative system 220 named "Phone Number."

Again, it should be noted that if all instances of a resource type are the same, a schema map can be defined for a resource type rather than on a resource by resource basis. For example, there can be one schema map for NT systems, on schema map for Unix, one schema map for LDAP and so on. However, in many cases an organization may use the same resource type differently. For example, different departments within an organization may record different types of information in the "description" field of NT user accounts. Thus, each resource of the same resource type may be unique and administrator 260 can define a separate resource map for each resource. An embodiment of a schema map is illustrated in FIG. 4.

As a further step in defining a resource, administrator 260, at step 515, can define an identity template used to generate information object names on that resource. The identity template can be used to generate a resource-specific names (e.g., an account name) given a virtual identity and its attributes. For example, if a virtual identity for a user already exists in identity index 310, the identity template can be used to generate a possible account name for that user on a resource, and then check the resource to see whether an account with that account name exists. The identity template can automatically associate an account discovered under the generate account name with the user. This "directed discovery" can be a very efficient way to associate additional user accounts with a virtual identity.

At step 516, administrator 260 can define resource name rules for each resource including account name rules and user name rules. In an account name rule, given the name of a user, software program 240 can generate a list of possible account names on the resource for a user. Account name rules can typically generate multiple account names, whereas the identity template defined at step 515 typically generates only one account name for a user. Furthermore, accounts discovered based on account name rules may require additional correlation, as will be described below. With a user name rule, given a particular resource account name, software program 240 can generate a list of possible users. For example, given the name "Jane Doe," and account name rule for email server 215 could generate the following possible matches for account names:

jdoe $(substr(1,1, $first))$(substr(1,4, $last))
doej $(substr(1,4, $last))$(substr(1,1, $first))
jdoe2 $(substr(1,1, $first))$(substr(1,4, $last))[1 . . . 9]

Administrator 260, at step 518, can also define a set of resource correlation rules. With an account correlation rule, given a set of resource accounts, software program 240 can test whether any of the accounts match a particular user based on the resource account attributes and a correlation key specified by administrator 260. For example, a correlation rule may be based on whether a particular resource has an attribute an employee number matching a known employee number for a user (e.g., as stored in identity index 310 or on another resource already associated with the user). The correlation rule can also include a formula involving manipulation of resource account attributes. With a user correlation rule, given a set of users, software program 240 can determine whether any of the users discovered match the account.

At step 520, administrator 260 can define one or more source resources. A source resource refers to a resource from which one or more users of system 200 may be discovered. If a complete list of users can be discovered from a single resource (e.g., a central directory) administrator 260 can configure software program 240 to read information objects (e.g., accounts) from that resource first. If a list of users can be discovered from nonoverlapping resources, then administrator 260 can configure software program 240 to read the user names from the non-overlapping resources. If a complete list of users can be discovered from resources that overlap but for which there is a correlation key (e.g., at least one data item associated with each user name that is common to both resources), administrator 260 can configure software program 240 to read the user names from the overlapping resources and detect duplicate names based on the correlation key.

For example, if one email server contained email accounts for all the programmers in an organization, while another email server contained email accounts for all the managers in the organization, but some of the managers were also programmers, the two sets of accounts would overlap. Administrator 260 could define a correlation rule to correlate the two sets of account and reject duplicates based on attributes such as employee name, social security number, employee number and so on. If, on the other hand, a list of users can be discovered from resources that overlap and for which there is no correlation key, administrator 260 can determine how a unique set of user can be discovered from the resources most easily. If a complete list of users can not be discovered, then administrator 260 can configure software program 240 to discover only a partial list of users.

From the source resource(s) defined by the administrator 260, software program 240, at step 522, can discover user identities. In other words, software program 240 can isolate the unique set of users represented by the accounts at the source resource(s). If a virtual identity does not exist in identity index 310 for a particular user discovered from the source resource, software program 240 can create a virtual identity based on one or more arbitrary attributes of the user's account found on the source resource (e.g., the user name) and according to the schema map for the source resource.

For example if the user Jane Doe is found on the source resource, a virtual identity can be created for Jane Doe by, for example, mapping the user name Jane Doe to a new virtual user name (e.g., equal to the account name, or as generated by any user name rule defined for the source resource). During importation of accounts, software program 240 can extract the account name. Additionally, software program 240 can also extract the account attribute values and convert them into a standard format according to the resource schema map for the source resource (i.e., can translate the account attributes into virtual attributes). In one embodiment of the present invention, some of the attributes are stored under a user's virtual identity in identity index 310 while the rest are kept only in volatile memory until software program 240 is finished manipulating them. For example, the attributes stored under a user's virtual identity could comprise the information required to access a user's account such as name, email address, organization, name of the resource on which the account was discovered, and so on, plus any additional attributes the organization wants stored in the index entry (e.g., if the organization wants to be able to search the index entry by user name, they may also wish to store attributes such as "firstname," "lastname," or "fullname"). Other resource attributes mapped to a virtual attribute by the schema map can be held in RAM (or other volatile memory) rather than saved in identity index 310.

Software program 240, at step 524, can discover or locate additional resource accounts for the users identities discovered at step 522. Using the resource definitions provided at step 516, software program 240 can connect with each resource and generate possible matching resource accounts. Again, for a user discovered in step 522 (e.g., user Jane Doe), software program 240 could interrogate email server 215 and find possible matching accounts (e.g., jdoe@organization.com, doe@organization, jdoe2@orgnanization.com) by generating a list of likely account names using any account name rule defined for the resource. Additionally, software program 240 can apply the correlation rules defined by administrator 260 to further select accounts. If, for example, on email server 215, each email account also had the employees name or identification number as an attribute, software program 240 could compare the employee ID number for an account matching Jane Doe found on another resource (e.g., the source resource or other earlier interrogated resource) based on the schema map. Alternatively, software program 240 can locate user resource accounts by correlation rules alone. For example, software program 240 can search email system 215 for accounts based on an "employee identification" attribute, or another resource-specific account attribute, without generating possible matches using account name rules. When a matching account is found, the resource name on which the account was found and the attributes for the matching account, such as account name, organization and any other attributes the organization wants to be stored, can be stored under the user's virtual identity in identity index 310.

In the above discussion, every resource identified by administrator 260 is interrogated for accounts for each user. However, administrator 260 can assign user roles that can be used to limit the resources scanned for a particular user. Each role implies a set of resources to which the user should have access. Embodiments of the discovery process can include searching for accounts only on the resources to which a user has access.

A role can be assigned to a user in several ways. This can be done by mapping a resource attribute to a "virtual" role attribute. For example, if the source resource contained a "job title" attribute, administrator 260 could map "job title" to the virtual "role" attribute. When a user's account is first imported from the source resource by software 240, the user's role can be assigned based on the job title. Alternatively, administrator 260 can specify a role as part of the import task. In such a case, the specified role is assigned to each user created by a particular import, regardless of any extracted account attributes. Finally, an administrator can specify a role when creating new user (e.g., a user not previously defined by a resource) or when editing an existing user.

To summarize steps 500-524. Administrator 260 can identify resources on system 200 and provide sufficient information to software program 240 so that software program 240 can access the resources. Administrator 260 can also define a schema map for each resource (or class of resources if each instance of a resource type is identical). The schema map for a resource maps one or more attributes from the information objects defined on the resource to one or more virtual attributes for a user. In addition, administrator 260 can define an identity template which can generate a resource-specific name (e.g., an account name) given a virtual identity and its attributes. At steps 516 and 518, administrator 260 can define resource name and correlation rules to aid in associating resource information objects with particular users. At step 520, administrator 260 can define one or more source resources from which one or more users can be derived based on the information objects contained on the source resource(s). Software program 240, at step 522, can interrogate the source resources and create a virtual identity for each user discovered from the source resource(s). For each user, software program 240 can save information object attributes, as chosen by administrator 260, from the source resource under the user's virtual identity. At step 524, software program 240 can interrogate the other resources defined by administrator 260 to find accounts that correspond to each user. Software program 240 can locate matching accounts based on account name rules and/or correlation rules and save attributes from the accounts under the user's virtual identity. In this manner, software program 240 can associate information objects (e.g., accounts) with virtual identities (e.g., users).

In addition to administrator 260 defining and identifying resources, the process of defining and identifying resources, at step 540, can be delegated to other administrators (e.g., departmental administrators or junior administrators). In the context of FIG. 2, for example, first departmental administrator 262 and second departmental administrator 264 can identify and define second Unix system 216 and third Unix system 218, respectively. Delegation allows resources to be identified and defined that may not be known to administrator 260, increasing the robustness and efficiency of embodiments of the embodiments of the present invention.

As a further step in delegation, the end-user may also be given authority to identify resources on which he or she has an account (step 542). The end user can select the resource on which the account resides, and then supply the account name. This allows users to locate stray accounts. For example, if Jane Doe works under first departmental administrator 262, but also occasionally works with employees under second departmental administrator 264, she may have accounts on both second Unix system 216 and third Unix system 218. While first departmental administrator 262 may know of her account on second Unix system 218, neither first departmental administrator 262 or second departmental administrator 264 may know of her account on third Unix system 218. This might occur because first departmental administrator 262 has no knowledge of third Unix system 218 and second departmental administrator 264 has no knowledge of Jane Doe. In such a case, Jane Doe may wish to associate her account on third Unix system 218 with herself at her virtual identity and can be given authority to do so (e.g., discovery of accounts can be further delegated to Jane Doe). In one embodiment of the present invention, however, Jane Doe may have to prove ownership of the account on third Unix system 218 through password authentication, for example, before the account will be associated with her in her virtual identity. This, combined with the functional restriction that an end-user is allowed to update only that end-user's virtual identity, permits secure delegation to an end-user.

Embodiments of the present invention have been described primarily in terms of user account management, however, it should be understood that the present invention is equally applicable to discovering any set of resource-specific information objects that together comprise a virtual identity. Embodiments of the present invention have been further described in terms of using and/or creating an identity index in which information objects are not replicated at a centralized database. However, it should also be understood that embodiments of the present invention can be used to extract and correlate accounts and other information objects to load into a centralized database or to populate a directory or meta-directory.

Embodiments of the present invention can comprise the steps of (i) defining at least one source resource, such as an email server, containing a set of information objects (e.g., accounts), wherein the set of information objects defines a set of users; (ii) discovering said set of users from said source resource; (iii) defining an additional resource containing a second set of information objects, wherein each information object from said second set of information objects corresponds to a user from said set of users; (iv) automatically discovering said second set of information objects from said additional resource; and (v) associating each information object from said second set of information objects with the corresponding user from said set of users.

Another embodiment of the present invention comprises (i) defining a first resource containing information objects defining a set of users; (ii) discovering said information objects based on said first resource definition; (iii) associating each of said information objects with a user from said set of users and with said first resource.

Yet another embodiment of the method of the present invention includes a method comprises the steps of (i) receiving a first resource definition from a first administrator, wherein said first resource contains a first set of information objects defining at least one user from a set of users; (ii) receiving a second resource definition from a second administrator, wherein said second resource contains a second set of information objects defining at least one user from said set of users; (iii) discovering said first set of information objects from said first resource; (iv) associating each information object from said first set of information objects with at least one user from said set of users and with said first resource; (v) discovering said second set of information objects from said second resource; and (vi) associating each information object from said second set of information objects with at least one user from said set of users and with said second resource.

Yet another embodiment of the present invention comprises the steps of (i) defining a plurality of resources, wherein each of the plurality of resources contains a set of information objects defining at least one user from a set of users; (ii) discovering said set of information objects from each of the plurality of resources; and (iii) associating each information object from said set of information objects with a user from said set of users and with the resource from which the corresponding information object was discovered.

Although the present invention has been described in detail herein with reference to the illustrative embodiments, it should be understood that the description is by of example only and is not to be construed in a limiting sense. It is to be further understood, therefore, that numerous changes in the details of the embodiments of this invention an additional embodiments of this invention will be apparent to, and may be made by, persons of ordinary skill in the art having reference to this description. It is contemplated that all such changes and additional embodiments are with the scope of this invention as claimed below.

What is claimed is:

1. A method for automated discovery of data, comprising:
    producing a resource definition for at least one computer-implemented resource, wherein the at least one resource is at least one source resource containing a set of information objects, wherein each resource definition is a source resource definition, and wherein said producing comprises defining each source resource, wherein the set of information objects defines a set of users;
    using the source resource definition for each at least one source resource to discover said set of users from said source resource; wherein said using the source resource definition is performed by a computer program process;
    defining an additional resource containing a second set of information objects, wherein each information object from said second set of information objects corresponds to a user from said set of users, wherein said defining an additional resource produces an additional resource definition;
    using the additional resource definition to discover said second set of information objects from said additional resource; wherein said using the additional resource definition is performed by the computer program process; and
    generating and storing data specifying an association of each information object from said second set of information objects with the corresponding user from said set of users and with said additional resource; wherein said generating and said storing are performed by the computer program process.

2. The method of claim 1, further comprising:
    defining a correlation rule; and
    associating each information object from said second set of information objects with the corresponding user from said set of users based on said correlation rule.

3. The method of claim 1, further comprising:
    defining a correlation rule;
    discovering said set of users from multiple source resources; and
    rejecting duplicate users from said set of users based on said correlation rule.

4. The method of claim 1, further comprising:
    creating a virtual identity for each user from said set of users, wherein each virtual identity includes an information object list associating at least one of said information objects from said second set of information objects with the corresponding user and with the said second resource.

5. The method of claim 4, wherein said information object list comprises:
    an information object name; and
    a resource name, wherein the resource name corresponds to the resource from which the information object corresponding to the information object name was discovered.

6. The method of claim 1, further comprising:
    providing connection information for said source resource; and
    providing connection information for said additional resource.

7. The method of claim 6, wherein the connection information for said source resource includes a hostname, a port, a username and a password and wherein the connection information for said additional resource includes a hostname, a port, a username and a password.

8. The method of claim 1, further comprising defining a schema map, wherein the schema map maps an attribute from said source resource to a virtual attribute.

9. The method of claim 1, further comprising a schema map, wherein said schema map maps an attribute from said additional resource to a virtual attribute.

10. The method of claim 9, further comprising:
    creating a virtual identity for each user from said set of users, wherein each virtual identity includes an information object list associating at least one of said information objects from said second set of information objects with the corresponding user.

11. The method of claim 10, wherein said information object list comprises:
    an information object name; and
    a resource name, wherein the resource name corresponds to the resource from which the information object corresponding to the information object name was discovered.

12. A method of discovering users and accounts, comprising:
    defining at least one computer-implemented source resource containing a first set of user accounts from which a set of users are discoverable, wherein said defining produces a definition for each at least one source resource;
    using the definition for each at least one source resource to discover said set of users based on said set of user accounts; wherein said using is performed by a computer program process; and
    generating and storing data specifying an association of each user account from said first set of user accounts with the corresponding user and with said source resource; wherein said generating and said storing are performed by the computer program process.

13. The method of claim 12, wherein said first set of user accounts resides on multiple source resources, further comprising:
    defining a correlation rule;
    discovering said set of users from said multiple source resources; and
    rejecting duplicate users according to said correlation rule.

14. The method of claim 12, further comprising:
    defining an additional resource containing a second set of user accounts, wherein each user account from said second set of user accounts corresponds to a user from said set of users;
    discovering said second set of user accounts based on said additional resource definition; and associating each of said second set of user accounts with the corresponding user from said set of users and with said additional resource.

15. The method of claim 14, further comprising:
defining a correlation rule;
associating each of said second set of user accounts with a user from said set of users based on said correlation rule.

16. The method of claim 15, further comprising:
creating a virtual identity for each user, wherein said virtual identity includes an account list associating resource accounts to the corresponding user.

17. The method of claim 14, further comprising identifying said additional resource.

18. The method of claim 14, further comprising defining a schema map for said additional resource.

19. The method of claim 18, further comprising mapping an attribute from said second set of resource accounts to a virtual attribute.

20. The method of claim 12, further comprising defining one or more roles for one or more users.

21. A system for discovering information on a network, comprising:
a computer readable memory; and
a software program stored on said computer readable memory and executable by a computer processor to:
receive a first resource definition, wherein said first resource contains a first set of information objects from which a set of users are discoverable;
connect to said first resource;
discover said user names;
receive a second resource definition, wherein said second resource contains a second set of information objects and wherein each of said second set of information objects corresponds to a user from said set of users;
discover said second set of information objects from said second resource;
associate each information object from said second set of information objects with the corresponding user; and
store data specifying an association of each information object from said second set of information objects with the corresponding user.

22. The system of claim 21, wherein said software program is further executable to:
receive a correlation rule; and
associate each information object from said second set of information objects with the corresponding user based on said correlation rule.

23. The system of claim 21, further comprising:
receiving a schema map for said second resource, wherein said schema map maps attributes from said second resource to virtual attributes.

24. The system of claim 23, wherein said virtual attributes are stored an identity index.

25. The system of claim 21, further comprising creating a virtual identity for each user from said set of users.

26. The system of claim 25, wherein said virtual identity includes an information object list associating said user with corresponding information objects.

27. A system for discovering information on a network, comprising:
a computer readable memory; and
a software program stored on said computer readable memory and executable by a computer processor to:
receive a first resource definition, wherein said first resource contains a first set of resource from which a set of users are discoverable;
connect to said first resource;
discover said user names;
receive a second resource definition, wherein said second resource contains a second set of resource accounts and wherein each of said second set of resource accounts corresponds to a user from said set of users;
discover said second set of resource accounts from said second resource;
associate each resource account from said second set of resource accounts with the corresponding user; and
store data specifying an association of each resource account from said second set of resource accounts with the corresponding user.

28. The system of claim 27, wherein said software program is further executable to:
receive a correlation rule; and
associate each resource account from said second set of resource accounts with the corresponding user based on said correlation rule.

29. The system of claim 27, further comprising:
receiving a schema map for said second resource, wherein said schema map maps attributes from said second resource to virtual attributes.

30. The system of claim 29, wherein said virtual attributes are stored an identity index.

31. The system of claim 27, further comprising creating a virtual identity for each user from said set of users.

32. The system of claim 31, wherein said virtual identity includes a resource account list associated said user with corresponding resource accounts.

33. A method for automated discovery of data, comprising:
receiving from a first administrator a definition of at least one computer-implemented resource containing a set of information objects, wherein the set of information objects defines a set of users, and wherein the at least one resource is at least one source resource;
using the definition of the at least one source resource to discover said set of users from said source resource; wherein said using the definition of the at least one source resource is performed by a computer program process;
receiving from said first administrator a definition of a second resource containing a second set of information objects, wherein each information object from said second set of information objects corresponds to a user from said set of users;
using the definition of the second resource to discover said second set of information objects from said second resource; wherein said using the definition of the second resource is performed by the computer program process; and
generating and storing data specifying an association of each information object from said second set of information objects with the corresponding user from said set of users; wherein said generating and said storing are performed by the computer program process.

34. The method of claim 33, further comprising:
receiving from a second administrator a definition of at least one additional resource containing a third set of information objects, wherein each information object from said third set of information objects corresponds to a user from said set of users;

associating each information object from said third set of information objects with the corresponding user from said set of users.

35. The method of claim 34, further comprising, receiving a stray account definition from an end user.

36. A method for discovering information, comprising:
receiving a resource definition from a first administrator, wherein the resource definition is a source resource definition for a source resource, wherein a set of users are discoverable from said source resource, wherein said source resource is a computer-implemented resource;
using the source resource definition to discover said set of users from said source resource; wherein said using the source resource definition is performed by a computer program process;
receiving an additional resource definition for an additional resource from a second administrator, wherein said additional resource contains information objects corresponding to each user from said set of users;
using the additional resource definition to discover said information objects from said additional resource; wherein said using the additional resource definition is performed by the computer program process; and
generating and storing data specifying an association of said information objects with said users from said set of users; wherein said generating and storing are performed by the computer program process.

37. The method of claim 36, wherein said information objects comprise user accounts.

38. The method of claim 36, further comprising, receiving a user resource definition from an end-user, wherein said user resource contains an additional information object corresponding to said user; and
associating said additional information object with said user.

39. The method of claim 38, wherein said additional information object comprises a user account.

40. The method of claim 38, further comprising:
requiring authentication from said user before associating said additional information object with said user.

41. A method for discovering data, comprising:
defining a computer-implemented first resource containing information objects defining at least one user from a set of users, wherein said defining produces a definition for the first resource;
using the definition to discover said information objects based on said first resource definition; wherein said using is performed by a computer program process;
generating and storing data specifying an association of each of said information objects with a user from said set of users and with said first resource; wherein said generating and storing are performed by the computer program process.

42. The method of claim 41 wherein said resource comprises a source resource.

43. The method of claim 41, further comprising:
defining a source resource; and
discovering said set of users from said source resource.

44. The method of claim 41, wherein said information objects comprise user accounts.

45. The method of claim 44, further comprising:
creating a virtual identity for each user from said set of users;
maintaining a resource account list for each virtual identity, wherein the resource account list for each virtual identity lists the resource accounts with which the corresponding user is associated and the resource from which each resource account was discovered.

46. The method of claim 45, further comprising:
defining a schema map for said first resource, wherein said schema map maps an attribute from said first resource to a virtual attribute.

47. The method of claim 41, further comprising, defining a role for at least one user from said set of users.

48. A method of discovering information, comprising:
receiving a first resource definition from a first administrator, wherein said first resource contains a first set of information objects defining at least one user from a set of users, wherein said first resource is a computer-implemented resource;
receiving a second resource definition from a second administrator, wherein said second resource contains a second set of information objects defining at least one user from said set of users;
using the first resource definition to discover said first set of information objects from said first resource; wherein said using the first resource definition is performed by a computer program process;
generating and storing data specifying an association of each information object from said first set of information objects with at least one user from said set of users and with said first resource; wherein said generating and storing are performed by the computer program process;
using the second resource definition to discover said second set of information objects from said second resource; wherein said using the second resource definition is performed by the computer program process; and
generating and storing data specifying an association of each information object from said second set of information objects with at least one user from said set of users and with said second resource; wherein said generating and storing are performed by the computer program process.

49. The method of claim 48, further comprising:
receiving a first source resource definition from said first administrator, wherein said source resource contains information objects defining at least a first portion of said set of users; and
discovering at least said first portion of said set of users from said first source resource.

50. The method of claim 49, further comprising:
receiving a second source resource definition from said second administrator, wherein said second source resource contains information objects defining at least a second portion of said set of users; and
discovering at least said second portion of said set of users from said second source resource.

51. The method of claim 50, further comprising:
receiving a third resource definition from an end-user, wherein said third resource contains a stray information object;
discovering said stray information object from said third resource; and
associating said stray information object with said end-user and with said third resource.

52. A method for discovering information, comprising:
defining a plurality of computer-implemented resources, wherein each of the plurality of resources contains a set of information objects defining at least one user from a set of users, wherein said defining produces a definition for each of the resources;

using each definition to discover said sets of information objects from each of the plurality of resources; wherein said using each definition is performed by a computer program process; and generating and storing data specifying an association of each information object from said sets of information objects with a user from said set of users and with the resource from which the corresponding information object was discovered; wherein said generating and storing are performed by the computer program process.

53. The method of claim 52, further comprising:

defining at least one source resource from which said set of users are discoverable; and discovering said set of users from said at least one source resource.

54. The method of claim 53, further comprising:

associating each source resource information object from a set of source resource information objects with a user from said set of users and with said source resource, wherein said source resource further comprises said set of source resource information objects defining said set of users.

55. The method of claim 52, further comprising:

defining a correlation rule; and associating each information object from said sets of information objects with a user based on said correlation rule.

56. The method of claim 52, wherein each information object comprises a resource account.

57. The method of claim 56, further comprising creating a virtual identity for each user, wherein each said virtual identity comprises a resource account list comprising a list of information objects associated with the corresponding user and the resource from which each such information object was discovered.

58. The method of claim 52, further comprising providing connection information for each of the plurality of resources.

59. The method of claim 52, further comprising defining at least one role for at least one user from said set of users, wherein said at least one role defines a set of resources from said plurality of resources from which information objects will be discovered for the corresponding user.

* * * * *

UNITED STATES PATENT AND TRADEMARK OFFICE
CERTIFICATE OF CORRECTION

PATENT NO.      : 7,574,413 B2
APPLICATION NO. : 10/006763
DATED           : August 11, 2009
INVENTOR(S)     : Larson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2284 days.

Signed and Sealed this

Seventh Day of September, 2010

David J. Kappos
*Director of the United States Patent and Trademark Office*